United States Patent
Bhandarkar (10) Patent No.: US 7,249,268 B2
(45) Date of Patent: Jul. 24, 2007

(54) METHOD FOR PERFORMING PERFORMANCE OPTIMIZATION OPERATIONS FOR A PROCESSOR HAVING A PLURALITY OF PROCESSOR CORES IN RESPONSE TO A STALL CONDITION

(75) Inventor: Dileep P. Bhandarkar, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 10/880,955

(22) Filed: Jun. 29, 2004

(65) Prior Publication Data

US 2005/0289365 A1    Dec. 29, 2005

(51) Int. Cl.
*G06F 1/32* (2006.01)
*G06F 1/00* (2006.01)
*G06F 15/00* (2006.01)

(52) U.S. Cl. .................. 713/320; 713/323; 702/188
(58) Field of Classification Search ........... 713/320, 713/300, 323; 702/188, 60
See application file for complete search history.

(56) References Cited

U.S. PATENT DOCUMENTS

| 6,141,762 | A  | * | 10/2000 | Nicol et al. ............. 713/300 |
| 6,317,840 | B1 | * | 11/2001 | Dean et al. ............. 713/320 |
| 6,631,474 | B1 | * | 10/2003 | Cai et al. ............... 713/300 |
| 6,804,632 | B2 | * | 10/2004 | Orenstien et al. ...... 702/188 |
| 6,908,227 | B2 | * | 6/2005  | Rusu et al. ............ 374/141 |
| 6,990,598 | B2 | * | 1/2006  | Sherburne, Jr. ........ 713/600 |
| 7,093,147 | B2 | * | 8/2006  | Farkas et al. .......... 713/320 |

* cited by examiner

*Primary Examiner*—Thomas Lee
*Assistant Examiner*—Suresh K Suryawanshi
(74) *Attorney, Agent, or Firm*—Michael R. Barre (57) ABSTRACT

Apparatus and method to make the most use possible of available capacities for the supply of power to and/or the dissipation of heat from a plurality of processor cores through responding to stalls in one or more of the processor cores among the plurality of processor cores by placing stalled processor cores into a lower power state and increasing the voltage and/or power of the remaining processor cores, and by decreasing the voltage and/or power of the remaining processor cores and taking stalled processor cores out of a lower power state when a condition causing a stall has ceased.

11 Claims, 4 Drawing Sheets

METHOD FOR PERFORMING PERFORMANCE OPTIMIZATION OPERATIONS FOR A PROCESSOR HAVING A PLURALITY OF PROCESSOR CORES IN RESPONSE TO A STALL CONDITION

BACKGROUND

Over time, various approaches have been employed to achieve ever higher processing performance in computer systems, including both operating processor cores at ever greater frequencies, and increasing the number of processor cores operating in parallel within the same computer system. However, both approaches suffer the disadvantages of increasing both the amount of power consumed and heat dissipated during the operation of such computer systems. More precisely, as the operating frequency of a processor core is increased, the amount of power required for the operation of that processor core increases and the amount of heat dissipated by that same processor core also increases. Also, as the number of processor cores operating within a given computer system increases, regardless of whether all the cores are fabricated on a single die or not, there is again, an increase in both the amount of power required and the amount of heat that is dissipated.

Finding ways to accommodate the ever greater quantities of heat dissipated has repeatedly proven to be quite problematic, regardless of whether the greater quantity of heat dissipated is due to a processor core operating at a higher frequency or is due to an increased number of processor cores being operated in parallel. Preventing damage to components within a computer system from the dissipation of increased quantities of heat often requires additional hardware such as more or larger fans, more or larger heatsinks, heatsinks with integrated heatpipes, heat exchangers with heatpipes, cooling systems based on liquid coolant, etc. Another, but related problem can be limits on the ability of the processor cores, themselves, to dissipate additional heat without damage. Such limits may arise from the packaging used to contain and protect the die on which one or more processor cores have been etched, or may arise from thermal limitations of the die, itself.

Limitations on the ability of processor cores to dissipate additional heat without damage become more acute as processor cores are designed with ever greater numbers of transistors in ever tighter spaces and as the practice of placing more than one processor core on the same die become more commonplace. As a result, schemes have been devised to manage the total heat dissipation of a given die equipped with multiple cores by placing a limit on the number of cores that may be allowed to be active at any one time, such that at least one of the cores is always in an inactive state. However, a significant drawback to this is that, invariably, as a result of an inflexible limit on the number of active cores at any one time, a core serving a time-critical software process is inevitably shut down for a long enough period of time as to cause irreparable disruptions to that software process. In an effort to resolve this concern, an approach of requiring a rotation of which processor cores are shut down such that no one core remains shut down for longer than a predetermined period of time has been considered. However, as long as one or more processor cores are required to be shut down, there continues to be a risk that a software process will eventually be starved to the point of failure by being forced to remain completely inactive for too long.

DETAILED DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

Embodiments of the present invention concern incorporating support within a processor and/or a computer system for managing power consumption and heat dissipation for processor cores. Although the following discussion centers on computer systems, it will be understood that embodiments of the claimed invention may be practiced in support of a number of different types of electronic devices employing various possible forms of processing components, whether general purpose processors or processing components directed at more specialized processing functions such as graphics, signal processing (e.g., DSPs), etc.

Figure 1:
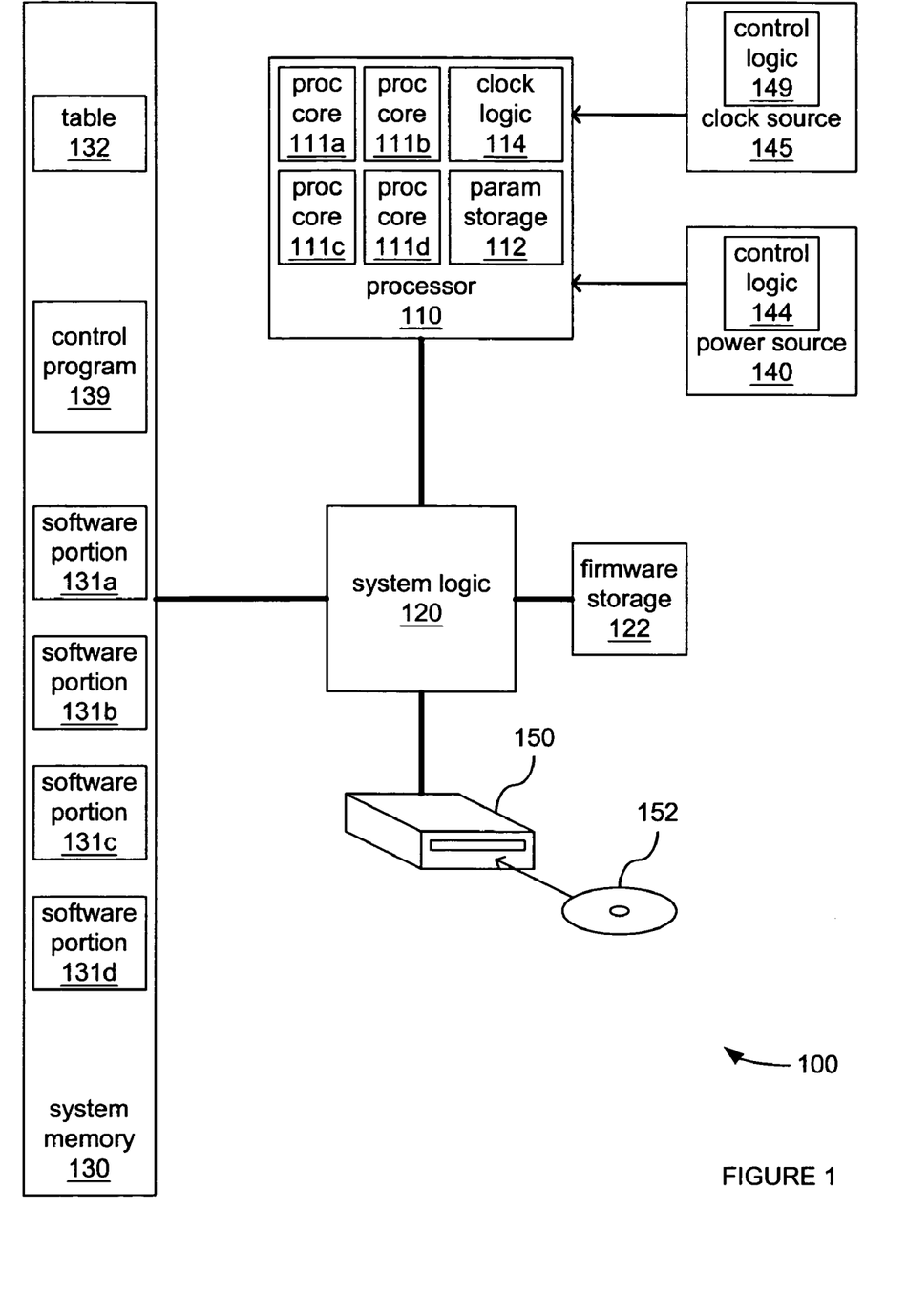
FIG. 1 is a block diagram of an embodiment employing a single processor with multiple processor cores.

FIG. 1 is a simplified block diagram of an embodiment employing a single processor with multiple processor cores. Computer system 100 is made up, at least in part, of processor 110, system logic 120 and system memory 130. System logic 120 is made up of one or more integrated circuits (ICs) coupled to processor 110 and performs various functions in support of processor 110 including providing processor 110 with access to system memory 130 to which system logic 120 is also coupled. Processor 110, system logic 120 and system memory 130 make up a form of core for computer system 100 that is capable of supporting the execution of machine readable instructions by processor 110 and the storage of data and instructions within system memory 130. Computer system 100 may be further made up of storage device 150, possibly coupled to system logic 120, and possibly employing storage media 152.

In various embodiments, processor 110 is made up of a single integrated circuit package (e.g., pin grid array package, ball grid array package, etc.) within which there are at least processor cores 111a, 111b, 111c and 111d. Processor cores 111a-d coexist within processor 110 to provide parallel processing functionality, and may follow a symmetric, asymmetric, or other form of parallel processing architecture. In some embodiments, all four of processor cores 111a-d may exist on a single semiconductor die carried within the package of processor 110, or in other embodiments, the package of processor 110 may carry multiple semiconductor dies with processor cores 111a-d distributed among those dies. It should be noted that although four processor cores are depicted, it will be understood by those skilled in the art that other quantities of processor cores are possible in other embodiments. In various embodiments, the number and type of processor cores within processor 110 may be chosen in an effort to create a processor of any of a number of possible types, including a general purpose processor, digital signal processor (DSP), etc. Each of processor cores 111a-d could each be of a reduced instruction set computer (RISC), complex instruction set computer (CISC), or other architecture, and each of processor cores 111a-d could be implemented to execute any of a number of possible types of instruction set, including at least a portion of the widely known and used "x86" instruction set.

In various embodiments, system memory 130 could be made up of any of a variety of types of random access memory (RAM) including fast page mode (FPM) or extended data out (EDO), single/double/quadruple data rate (i.e., SDR, DDR or QDR) forms of synchronous dynamic RAM (SDRAM), various technologies of RAM employing a RAMBUS™ interface, etc. In various embodiments, a memory controller, either within system logic 120 or elsewhere within computer system 100, provides an appropriate interface for whichever type of memory is employed. Furthermore, in various embodiments, system memory 130 may, by way of example, be implemented as one or more memory ICs directly attached to a surface of a circuitboard to which processor 110 may also be directly attached, or system memory 130 may be implemented as one or more miniature circuitboards configured to be releasably plugged into a circuitboard through one or more connectors (e.g., SIMMs, DIMMs, SIPPS, etc.) and to which one or more memory ICs are attached.

Computer system 100 is also made up, at least in part, of power source 140 and clock source 145. Power source 140 is coupled to and supplies power to at least processor 110 at a voltage that is controllable through control logic 144 either coupled to or incorporated within power source 140. Clock source 145 is coupled to and supplies a clock signal to at least processor 110 at a frequency that may be controllable through control logic 149 either coupled to or incorporated within clock source 145. Within processor 110, clock logic 114 receives the clock signal supplied by clock source 145 and multiplies the frequency of that clock signal to create a processor clock of a frequency at which all four of processor cores 111a-d will be driven. Both clock source 145 through control logic 149 and clock logic 114 are operated in a coordinated manner to arrive at a specific desired processor clock frequency. An increase in the frequency at which processor cores, such as processor cores 111a-d, are operated (i.e., an increase in the processor clock frequency) results in a corresponding need for more power to be provided. So, clock source 145 and clock logic 114 are controlled to increase the resulting processor clock frequency, power source 140 through control logic 144 must be operated to increase the voltage supplied to processor 110 to provide the requisite increase in power. Correspondingly, a decrease in the processor clock frequency will allow the voltage supplied to processor 110 by power source 140 to be decreased as a result of reduced power requirements.

In some embodiments, parameter storage 112 incorporated into processor 110 may provide data, possibly in tabular form, listing various possible processor clock frequencies at which all four of processor cores 111a-d may be operated and corresponding voltages for power being supplied to processor 110 for each of those frequencies. Furthermore, in some embodiments, parameter storage 112 may also provide data listing further possible combinations of processor clock frequencies and power supply voltages for when one or more of processor cores 111a-d are placed into some form of lower power state, such as a "sleep mode," whereby such processor cores are rendered inactive in such a way as to draw less power.

Although for reasons of achieving the highest possible levels of performance in executing instructions, it may be deemed desirable to operate all four of processor cores 111a-d at the highest possible processor clock frequency that the circuitry making up all four of processor cores 111a-d can support, this may be prevented as a result of various possible limits imposed in various possible embodiments. For example, in some embodiments, a limit may be imposed as to how much power can be supplied to processor cores 111a-d. Such a limit may be imposed by power source 140 being unable to provide more than a specific amount of power, by physical limitations of conductors carrying power from power source 140 to processor 110 causing those conductors to be unable to carry more than a specific amount of power, or by physical limitations of the package of processor 110 being able to carry more than a specific amount of power from where it is provided from power source 140 at the contacts on the outside of the package to processor cores 111a-d inside the package. Also, by way of example, in some embodiments, a limit may be imposed as to how much heat can be allowed to be dissipated from processor cores 111a-d. Such a limit may be imposed by computer system 100 being unable to remove heat at more than a specific rate without one or more components within computer system being damaged, or a physical limitation of the package of processor 110, itself, being unable to support the dissipation of heat at more than a specific rate without damage. In some embodiments, where a limit on either power that can be provided to or heat collectively dissipated by processor cores 111a-d is imposed by a component of computer system 100 other than processor 110, information concerning that limit may be stored within firmware storage 122 (possibly a ROM, EEPROM, flash memory, or other memory device), coupled to system support logic 120 (or coupled to some other portion of computer system 100). Otherwise, where a limit is imposed by some aspect of processor 110, itself, information concerning that limit may be stored within parameter storage 112.

At various times during the normal operation of computer system 100, various ones, and perhaps all, of processor cores 111a-d execute software instructions stored within system memory 130, such as instructions making up software portions 131a, 131b, 131c and 131d. Some or all of software portions 131a-d may be portions of an operating system providing support for the execution of instructions of pieces of applications software, and some or all of software portions 131a-d may be portions of applications software (e.g., database, data analysis, simulation, email communications, web hosting, word processing, graphics editing, etc.). It should be noted that the depiction of differing software portions 131a-d is for purposes of illustration, and that as those skilled in the art will readily recognize, more than one of processor cores 111a-d may execution the same portion(s) of software, such that those portions of software are shared between those cores. The provision of all four of processor cores 111a-d to provide parallel processing functionality allows each of processor cores 111a-d to substantially independently and substantially simultaneously execute software instructions from each of software portions 131a-d, respectively. However, as those skilled in the art will readily recognize, it is not uncommon for a processor core to become "stalled" such that the processor core is forced to become idle while waiting a number of cycles of a processor clock for an event to take place involving another component of computer system 100, for a piece of data to be received (possibly arising from a cache miss situation), for instructions to be retrieved from memory, for a semaphore coordinating the execution of two or more sets of instructions to signal that execution may proceed, etc. One recurring event upon which a processor core waits is the retrieval of data and/or further instructions to execute from a memory system, such as system memory 130, and the number of processor clock cycles that occur during that wait may be considerable as it is not uncommon for a processor core to be capable of executing instructions far faster than it is possible for a memory system to be able to provide needed data and/or instructions.

In various embodiments, the fact of these recurring stalls of one or more of processor cores 111a-d is availed of as an opportunity to increase the speed of execution of instructions for the others of processor cores 111a-d that are not stalled, especially where limits have been imposed on either the amount of power that can be provided to processor cores 111a-d or the collective amount of heat that can be permitted to be dissipated by processor cores 111a-d. In such embodiments, each of processor cores 111a-d that are stalled may be put into a lower power state, thereby removing some of the demand for power and freeing up capacity for heat dissipation, thereby allowing the frequency of the processor clock and/or the voltage of the supplied power to be increased so as to allow the other ones of processor cores 111a-d that are not stalled to execute instructions faster. In such embodiments, the extent to which the processor clock and voltage are increased is determined by whatever limits may exist on power supply and heat dissipation capacities available within computer system 100. In other words, where power capacity is a limiting factor, the placing of one of processor cores 111a-d into a lower power state frees up power capacity that may be used by the remaining processor cores, thereby allowing those remaining processor cores to each use more power while being operated at a higher frequency. Similarly, where the capacity to accommodate the collective heat dissipation of all of processor cores 111a-d is a limiting factor, the placing of one or more of processor cores 111a-d into a lower power state makes available more capacity to accommodate the collective heat dissipation of the remaining processor cores, thereby allowing those remaining processor cores to each dissipate more heat while being operated at a higher frequency. Also, as one of processor cores 111a-d that was placed into a lower power state is brought back into an active state as a result of the ending of the condition(s) that caused that processor core to become stalled, the processor clock frequency and/or the voltage is decreased so that each of processor cores 111a-d that is now active will dissipate less heat.

In some embodiments, one or more of processor cores 111a-d execute instructions that are part of control program 139 residing with system memory 130 to effect the increasing and/or decreasing of both the voltage of the power supplied by power source 140 and the processor clock frequency provided to processor cores 111a-d from the combination of clock source 145 and clock logic 114. In some variations, control program 139 may be stored within firmware storage 122 with portions copied into system memory 130, perhaps to take advantage of system memory 130 being faster than firmware storage 122, while in other variations, control program 139 may be stored within storage media 152 (readable possibly by storage device 150) and be copied into system memory 130.

In such embodiments, whichever one(s) of processor cores 111a-d that execute a portion of control program 139 may be caused to write registers or otherwise signal some form of control logic within processor 110 to place one or more of processor cores 111a-d that are stalled in a lower power state and then place one or more of those same processor cores back into an active state when the stall condition(s) ends. Such processor cores 111a-d executing a portion of control program 139 may also write to registers or otherwise signal control logic 144 of power source 140 to increase or decrease the voltage of the power supplied to processor 110, as well as write to registers or otherwise signal one or both of control logic 149 and clock logic 114 to increase or decrease the frequency of the processor clock. In some variations of such embodiments, the processor clock may be increased or decreased by changing the clock signal provided by clock source 145 to processor 110, while in some other variations of such embodiments, the processor clock may be increased or decreased by changing the multiplying factor used by clock logic 114 to multiply the frequency of the clock signal received by processor 110 from clock source 145 to create the processor clock frequency.

Also in such embodiments, data concerning the limits to available power supply or heat dissipation capacity may be retrieved from storage within parameter storage 112, firmware storage 122 and/or storage media 152. Alternatively, such data may be retrieved from either firmware storage 122 or storage media 152 and copied into parameter storage 112 for subsequent reading and use, possibly at a time when computer system 100 is reset or initialized. As previously mentioned, in some embodiments, data concerning limits imposed by characteristics of the packaging or other aspects of processor 110 on either power supply or heat dissipation capacity may be stored within parameter storage 112 within processor 110. Storage of such data within parameter storage 112 may be deemed desirable as a way of ensuring that such data remains matched to the specific one of processor 110 to which such data applies, and may be especially valuable in embodiments of computer system 100 where processor 110 is intended to be replaceable with another processor that may well have different limits. Alternatively, in other embodiments, data concerning limits imposed by characteristics of processor 110 may be provide from storage within firmware storage 122 and/or storage media 152, or perhaps, may be accessed from a remote location across a network (not shown), as a way of making possible the speedy application of updates to that data if needed. Also as previously mentioned, in some embodiments, data concerning limits imposed by components or other aspects of computer system 100 outside of processor 110 (such as power capacity limits of power source 140, or heat dissipation capacity limits imposed by the design of the cooling system employed by computer system 100) may be stored in firmware storage 122, although storage of such data in storage media 152 or retrieval of such data from across a network are also possible in other embodiments. In some embodiments, control program 139 may copy some or all of whatever data is available concerning such limits as imposed by either processor 110 or other components from parameter storage 112, firmware storage 122 and/or storage media 152 into system memory 130, possibly for reasons of faster access, and possibly creating a tabular or other data structure of such data, such as table 132.

Figure 2:
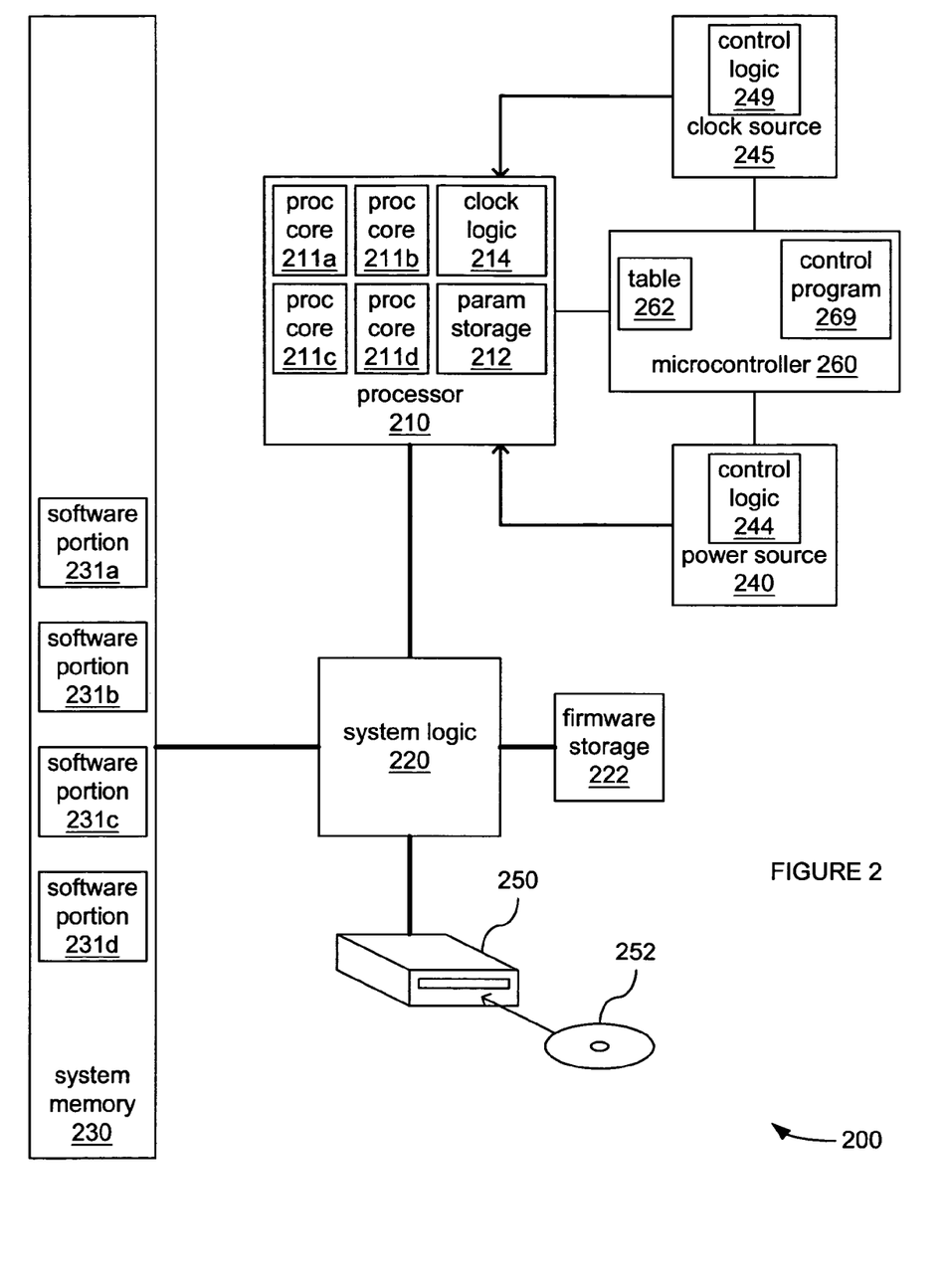
FIG. 2 is a block diagram of another embodiment employing a single processor with multiple processor cores.

FIG. 2 is a simplified block diagram of another embodiment employing a single processor with multiple processor cores. Not unlike computer system 100 of FIG. 1, computer system 200 is made up, at least in part, of processor 210, system logic 220, firmware storage 222 (a ROM, EEPROM, flash memory, etc.), system memory 230, power source 240, clock source 245, and possibly, storage device 250. Not unlike processor 110 of computer system 100, processor 210 is made up of single integrated circuit package within which are processor cores 211a-d (either all on a single die, or distributed among multiple dies within the integrated circuit package) to support some form of parallel processing within processor 210, and the combination of processor 210, system logic 220 and system memory 230 make up a form of core for computer system 200 that is capable of supporting the execution of machine readable instructions by processor 210 and the storage of data and instructions within system memory 230. However, unlike computer system 100, computer system 200 is further made up of microcontroller 260, providing processing capability separate from processor cores 211a-d within processor 210 to monitor various aspects of the operation of computer system 200 and/or to carry out various tasks in support of the operation of computer system 200. Although FIG. 2 depicts microcontroller 260 as being entirely outside processor 210, in other embodiments, portions of or all of microcontroller 260 may be incorporated into processor 210, and perhaps on the same die as one or more of processor cores 211a-d.

In a manner not unlike processor cores 111a-d and software portions 131a-d of FIG. 1, the fact that stalls in the execution of instructions from software portions 231a-d within system memory 230 by processor cores 211a-d, respectively, may be expected to occur, along with stalls precipitated by other causes and various other events that may cause one or more of processor cores 211a-d to be forced to remain idle through several clock cycles, is employed as an opportunity to increase the speed of execution of instructions from the others of software portions 231a-d by processor cores 211a-d, respectively. In such embodiments, each of processor cores 211a-d that are stalled may be put into some form of lower power state, such as a sleep mode, thereby removing some demand for power and freeing up capacity for heat dissipation, and the frequency of the processor clock and/or the voltage of the power may be increased so as to allow the other ones of processor cores 211a-d to be provided with power at a higher voltage from power source 240 and/or operated with a higher frequency processor clock provided by the combination of clock source 245 and clock logic 214. Also, as one of processor cores 211a-d that was placed into a lower power mode is brought back into an active state as a result of changing circumstances that no longer necessitate those cores remaining idle, such as the execution of instructions from one of software portions 231a-d no longer being stalled, the processor clock frequency may be decreased so that each of processor cores 211a-d that are now active will require less power and will dissipate less heat, and the voltage of the power supplied by power source 240 may be reduced, accordingly.

Unlike computer system 100, where a control program to cause the placing of processor cores into and out of a lower power state and to cause the increasing and decreasing of voltage and/or processor clock frequency was executed by one or more of the processor cores, themselves, in computer system 200, microcontroller 260 independently executes instructions of control program 269 stored within memory directly accessible by microcontroller 260. In some embodiments, computer system 200 may make possible the updating of control program 269 with a newer version provided by storage media 252 as accessed through storage device 250, if present. In executing instructions of control program 269, microcontroller 260 may be caused to write registers or otherwise signal logic within processor 210 to place one or more of processor cores 211a-d that are stalled into a lower power state and then place one or more of those same processor cores back into an active state when the stall condition(s) end. Microcontroller 260 may also write to registers or otherwise signal control logic 244 of power source 240 to increase or decrease the voltage of the power supplied to processor 210, as well as write to registers or otherwise signal one or both of control logic 249 and clock logic 214 to increase or decrease the frequency of the processor clock. In some variations of such embodiments, the processor clock may be increased or decreased by changing the clock signal provided by clock source 245 to processor 210, while in some other variations of such embodiments, the processor clock frequency may be increased or decreased by changing the multiplying factor used by clock logic 214 to multiply the frequency of the clock signal received by processor 210 from clock source 245 to create the processor clock frequency.

In some embodiments, data concerning the limits to available power supply or heat dissipation capacity may be retrieved from storage within parameter storage 212, firmware storage 222 and/or storage media 252. In some embodiments, data concerning limits imposed by characteristics of the packaging or other aspects of processor 210 on either power supply or heat dissipation capacity may be stored within parameter storage 212 within processor 210, may be provided by firmware storage 222 and/or storage media 252, or may be accessed from a remote location across a network (not shown). Also, in some embodiments, data concerning limits imposed by components or other aspects of computer system 200 outside of processor 210 may be stored in firmware storage 222, although storage of such data in storage media 252 or retrieval of such data from across a network are also possible in other embodiments. In some embodiments, control program 269 may copy some or all of whatever data is available concerning such limits as are imposed by either processor 210 and/or other components from parameter storage 212, firmware storage 222 and/or storage media 252 into memory to which microcontroller 260 has direct access, possibly for reasons of faster access, and possibly creating a tabular or other data structure of such data, such as table 262. In some embodiments, table 262 may provide a list of possible combinations of voltages and processor clock frequencies determined to be within limits imposed by processor 210 and/or other components of computer system 200 for differing numbers of processor cores 211a-d being placed into a lower power state. As previously discussed, microcontroller 260 may be incorporated into processor 210 in some embodiments, and in such embodiments, one or both of table 262 or control program 269 may share a single storage device with the contents of parameter storage 212.

In still other embodiments, microcontroller 260 may not only be incorporated within processor 210, but may be replaced, entirely, by a control logic lacking a processing element to carry out the functions of microcontroller 260, just described, but without the added complexity of the execution of a control program, such as control program 269. In such embodiments, such control logic may be combined with clock logic 214, thereby possibly also incorporating control over the multiplying factor used to multiply the frequency of the clock signal received by processor 210 from clock source 245.

Figure 3:
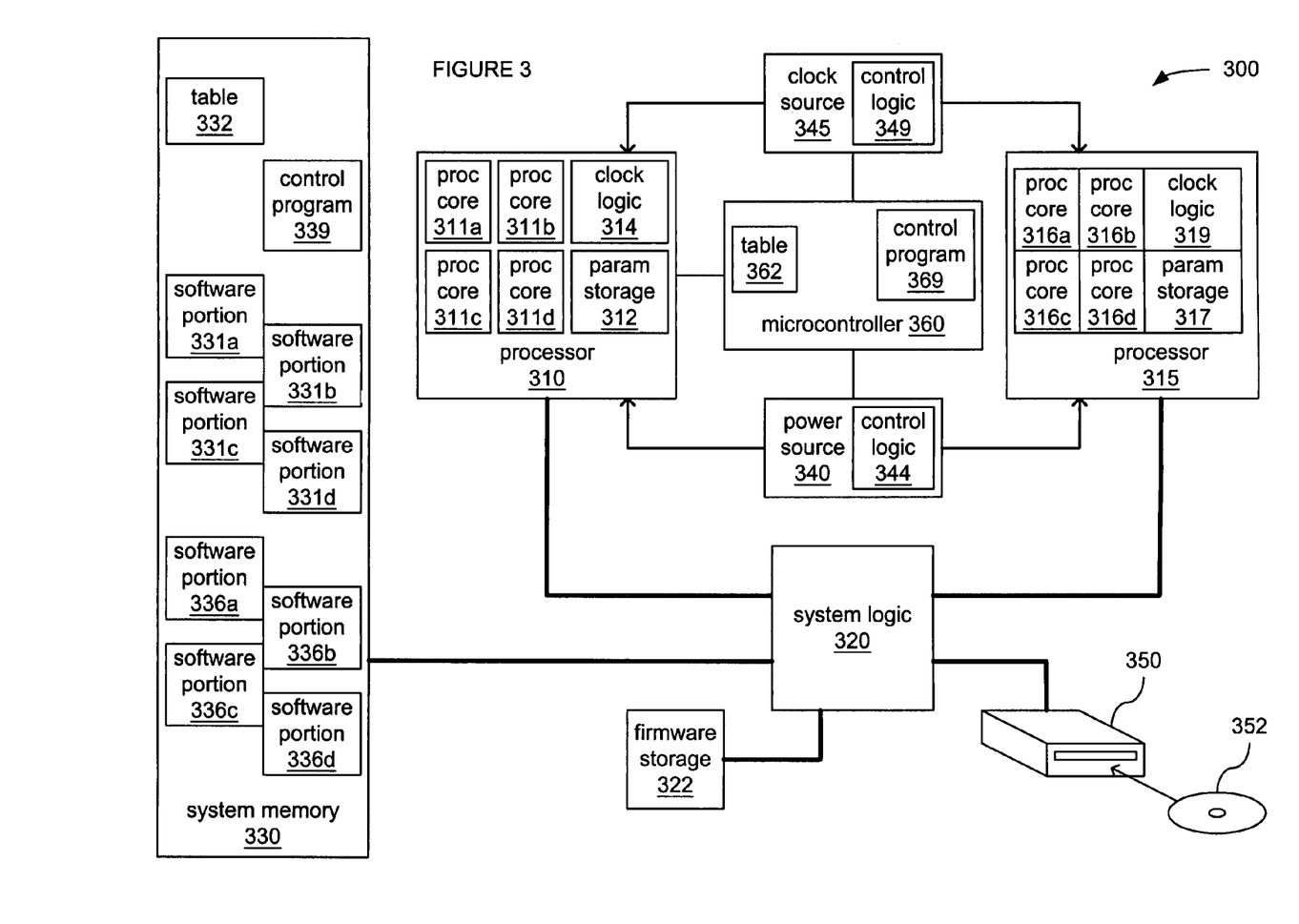
FIG. 3 is a block diagram of an embodiment employing a multiple processors, each with multiple processor cores.

FIG. 3 is a simplified block diagram of an embodiment employing a multiple processors, each with multiple processor cores. Not unlike computer systems 100 and 200 of FIGS. 1 and 2, computer system 300 is made up, at least in part, of processor 310, system logic 320, firmware storage 322 (e.g., some form of EPROM, flash memory, etc.), system memory 330, power source 340, clock source 345, and possibly, one or both of storage device 350 (possibly employing storage media 352) and microcontroller 360, although unlike either of computer systems 100 or 200, computer system 300 is further made up of a second processor, namely processor 315. Not unlike processors 110 and 210 of computer systems 100 and 200, processors 310 and 315 are each made up of single integrated circuit package within which are processor cores 311a-d and 316a-d, respectively, to support some form of parallel processing within each of processors 310 and 315, as well as between processors 310 and 315. As previously discussed with regard to processors 110 and 210, processor cores 311a-d and 316a-d of each of processors 310 and 315, respectively, may be implemented on a single die within each of processors 310 and 315, or may be distributed among multiple dies within each of processors 310 and 315. Also, the combination of processors 310 and 315, system logic 320 and system memory 330 make up a form of core for computer system 300 that is capable of supporting the execution of machine readable instructions by processors 310 and 315, and the storage of data and instructions within system memory 330. In various possible embodiments, computer system 300 may also be further made up of microcontroller 360 to monitor various aspects of the operation of computer system 300 and/or to carry out various tasks in support of the operation of computer system 300.

In a manner not unlike processor cores 111a-d and 211a-d, and software portions 131a-d and 231a-d of FIGS. 1 and 2, respectively, the fact that stalls in the execution of instructions from software portions 331a-d and 336a-d within system memory 330 by processor cores 311a-d and 316a-d (whether some of those portions of software are shared between multiple cores, or not) may be expected to occur, along with other events occurring within computer system 300 that may also cause one or more of processor cores 311a-d and 316a-d to remain idle, is employed as an opportunity to increase the speed of execution of instructions from the others of software portions 331a-d and 316a-d. In such embodiments, each of processor cores 311a-d and 316a-d that are caused to become idle may be put into a lower power state, thereby possibly removing some demand for power and/or freeing up some capacity for heat dissipation, thereby allowing the frequency of the processor clock and/or the voltage of the power to be increased so as to allow the other ones of processor cores 311a-d and/or 316a-d to be provided with power at a higher voltage from power source 340 and/or operated with a higher frequency processor clock provided by the combination of clock source 345 and clock logic 314 for processor 310 or clock logic 319 for processor 315. Also, as one of processor cores 311a-d and/or 316a-d that was placed into a lower power state is brought back into an active state, the processor clock frequency may be decreased so that each of processor cores 311a-d and/or 316a-d that is now active will require less power and will dissipate less heat, and the voltage of the power supplied by power source 340 may be reduced, accordingly.

In some embodiments, data concerning limits imposed by characteristics of the packaging or other aspects of processors 310 and 315 on either power supply or heat dissipation capacity may be stored within parameter storages 312 and 317, respectively, or may be provided by firmware storage 322 and/or storage media 352 or from a remote location across a network (not shown). Also, in some embodiments, data concerning limits imposed by components or other aspects of computer system 300 outside of processors 310 and 315 may be stored in firmware storage 322, although storage of such data in storage media 352 or retrieval of such data from across a network are also possible in other embodiments, and such data may be copied into one or both of parameter storages 312 and 317.

In some embodiments, in a manner not unlike computer system 100, processor cores 311a-d and/or 316a-d may execute instructions of control program 339 to cause the placing of processor cores into and out of a lower power state and to cause the increasing and/or decreasing of voltage and/or processor clock frequency. In such embodiments, data concerning power supply and/or heat dissipation capacity may be copied into table 332 within system memory 330. In other embodiments, in a manner not unlike computer system 200, microcontroller 360 may execute instructions of control program 369 to cause the placing of processor cores into and out of a lower power state and to cause the increasing and/or decreasing of voltage and/or processor clock frequency. In such other embodiments, data concerning power supply and/or heat dissipation capacity may be copied into table 362 directly accessible by microcontroller 360. In still other embodiments, one or more of processor cores 311a-d and/or 316a-d execute instructions of control program 339 in cooperation with microcontroller 360 executing instructions of control program 369, with control program 339 involved in monitoring occurrences of stalls and possibly controlling the entry and exit of one or more of processor cores 311a-d and/or 316a-d into and/or out of a lower power state, and with control program 369 involved in controlling power source 340, clock source 345 and/or one or both of clock logics 314 and 319 to increase and/or decrease voltage and/or processor clock frequency.

In still other embodiments, a form of control logic that either incorporates a processing element to execute a control program, like microcontroller 360, or that does not incorporate any processing element, may be incorporated into one or both of processors 310 and 315. In such other embodiments, such control logic within each or processors 310 and 315 may act independently to separate raise or lower either voltages and/or clocks received by processors 310 and 315. Alternatively, such control logic in one of processors 310 and 315 may operate in a coordinated manner (or the control logic within one of processors 310 and 315 may assume control over the other) so as to coordinate the voltages and/or clock(s) received by processors 310 and 315.

In some embodiments, power source 340 provides power at the same voltage to both processors 310 and 315, and clock source 345 provides a common clock signal to both processors 310 and 315. In such embodiments, tradeoffs may have to be made under the control of one or both of control programs 339 and 369 to take advantage, where possible, of the opportunities afforded by stalls to place a processor core into a lower power state while speeding up the other processor cores that are not in a lower power state while ensuring that limits of voltage and/or processor clock frequency are not exceeded. For example, if one of processor cores 311a-d is stalled and is able to be placed into a lower power state at the same time that all four of processor cores 316a-d are still active, it may not be possible to increase either the voltage output from power source 340 or the frequency of the clock signal from clock source 345, because the fact that all four of processor cores 316a-d are still active may not allow for such increases. Therefore, in such embodiments, it may be necessary to wait until one or more processor cores within both of processors 310 and 315 are placed into a lower power state before such increases in either voltage or processor clock frequency may be made. However, such restrictions may be somewhat alleviated if clock logics 314 and 319 are used to carry out the independent increasing and decreasing of processor clock frequencies for each of processors 310 and 315 by independently altering the multipliers used to convert the clock signal received from clock source 345 into separate processor clocks. In still other alternative embodiments, power source 340 may provide power with independently controllable voltages to each of processors 310 and 315 (or there may be separate ones of power source 340 for each of processors 310 and 315), and this provision of separately controllable voltages, in conjunction with separate clock multipliers being independently controlled by clock logics 314 and 319 may be used to provide independent control of both voltage and processor clock frequencies for each of processors 310 and 315, such that differing numbers of processor cores placed into a lower power state in each of processors 310 and 315 may be independently and more optimally availed of. In still other embodiments, power source 340 and clock source 345 provide entirely independent power supply voltages and clock frequencies to each of processors 310 and 315.

Figure 4:
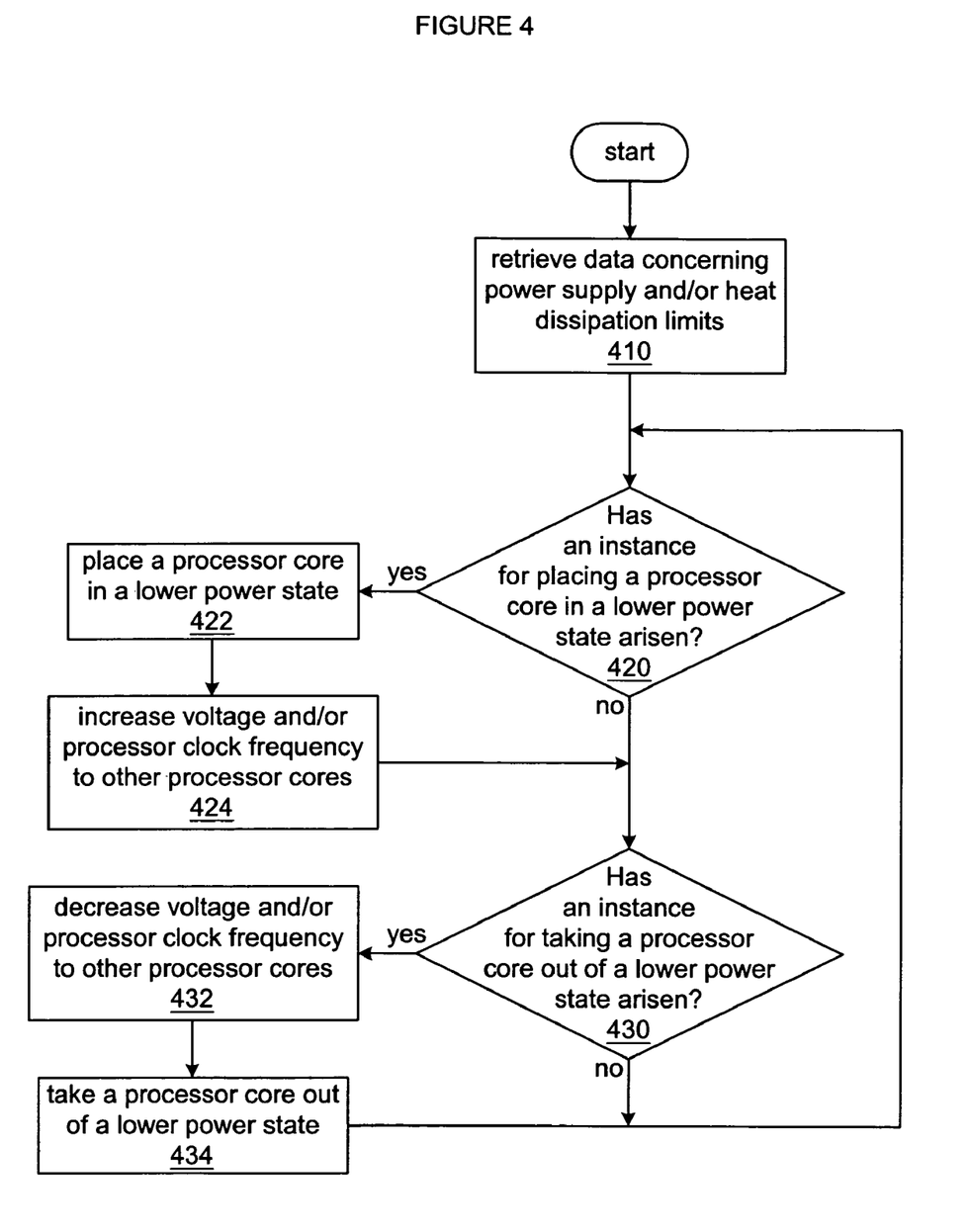
FIG. 4 is a flowchart an embodiment of power and performance optimization.

FIG. 4 is a flowchart of an embodiment availing of occasions on which one or more of multiple processor cores may be placed into and taken out of a lower power state. At 410, data concerning limitations imposed on one or both of power supply capacity and heat dissipation capacity are retrieved from one or more storage devices either within a processor having multiple cores or within some other portion of a computer system of which that processor is a part. At 420, a check is made as to whether or not a condition has arisen (such as a stall in the execution of instructions for a portion of software, etc.) causing a processor core to become idle that provides an instance for placing a processor core into a lower power state. If such a condition has arisen, then the processor subject to the condition is placed in a lower power state at 422, and at 424, the voltage of the power supplied to at least some other processor cores not in a lower power state and/or the processor clock frequency to those other processor cores is increased. Regardless of whether a condition for placing a processor core in a lower power has arisen or not, at 430, a check is made as to whether or not a condition has arisen that provides an instance for taking a processor core out of a lower power state. If such a condition (such as an end of the stall in execution of instructions, etc.) has arisen, then the voltage of the power supplied to at least some other processor cores (those that share the same voltage supply as the processor core affected by the condition) and/or the processor clock frequency of those other processor cores is decreased at 432, and at 434, the processor core affected by the condition is taken out of a lower power state. Regardless of whether or not a condition for taking a processor core out of a lower power state has arisen or not, the check for a condition under which a processor core would be placed into a lower power state is repeated at 420.

The invention has been described in some detail with regard to various possible embodiments. It is evident that numerous alternatives, modifications, variations and uses will be apparent to those skilled in the art in light of the foregoing description. It will be understood by those skilled in the art that the present invention may be practiced in support of many possible types of graphics hardware memory devices employing any of a number of possible types of graphics data. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. A method comprising:
in a processing system with a processor having a plurality of processor cores in which all of the processor cores are operating at a first voltage and a first frequency and at least one of the processor cores is not idle but is executing a command that has caused a stall condition, performing performance optimization operations in response to the stall condition, the performance optimization operations comprising:
placing the processor core that is executing the command that caused the stall condition into a lower power state;
checking data concerning maximum values for clock frequency and power supply voltage to be provided to the processor, wherein the data concerning maximum values comprises a table with multiple entries, wherein each entry lists a predetermined voltage and corresponding predetermined frequency determined to be suitable when a specified number of processor cores is in the lower power state, and wherein the operation of checking the data comprises using the table to determine a suitable voltage and corresponding frequency, based on a current number of processor cores in the lower power state; and
increasing frequency and voltage of at least one non-stalled processor core, based on the entry in the table for the current number of processor cores in the lower power state;
after increasing frequency and voltage of at least one non-stalled processor core, responding to termination of the stall condition by performing operations comprising:
decreasing frequency and voltage of at least one non-stalled processor core; and
taking the processor core for which the stall condition has terminated out of the lower power state.

2. The method of claim 1, wherein the stall condition comprises waiting for receipt of a piece of data needed by the processor core that caused the stall condition.

3. The method of claim 1, wherein checking data concerning maximum values for clock frequency and power supply voltages to be provided to the processor further comprises reading data stored within a storage device within the processor.

4. The method of claim 3, wherein increasing the frequency of at least one non-stalled processor core further comprises maintaining the frequency beneath a maximum determined from the data stored within the storage device within the processor.

5. The method of claim 1, wherein checking data concerning maximum values for dock frequency and power supply voltages to be provided to the processor further comprises reading data specifying a maximum value based on a limitation imposed by an electronic apparatus of which the processor is a component.

6. The method of claim 1, wherein increasing the frequency of at least one non-stalled processor core further comprises signaling a clock source to increase the frequency of a clock signal that the clock source provides to the processor.

7. The method of claim 1, wherein increasing the frequency of at least one non-stalled processor core further comprises altering a clock multiplier employed by logic within the processor to step up the frequency of a clock received by the processor from a clock source.

8. A machine-accessible medium comprising code that when executed by a processor having a plurality of processor cores within an electronic system, causes the processor to:
  when all of the processor cores are operating at a first voltage and a first frequency and at least one of the processor cores is not idle but is executing a command that has caused a stall condition, performing performance optimization operations in response to the stall condition, the performance optimization operations comprising:
  placing the processor core that is executing the command that caused the stall condition into a lower power state;
  checking data concerning maximum values for clock frequency and power supply voltage to be provided to the processor, wherein the data concerning maximum values comprises a table with multiple entries, wherein each entry lists a predetermined voltage and corresponding predetermined frequency determined to be suitable when a specified number of processor cores is in the lower power state, and wherein the operation of checking the data comprises using the table to determine a suitable voltage and corresponding frequency, based on a current number of processor cores in the lower power state; and
  increasing frequency and voltage of at least one non-stalled processor core of the processor, based on the entry in the table for the current number of processor cores in the lower power state;
  after increasing frequency and voltage of at least one non-stalled processor core, responding to termination of the stall condition by performing operations comprising:
  decreasing frequency and voltage of at least one non-stalled processor core; and
  taking the processor core for which the stall condition has terminated out of the lower power state.

9. The machine-accessible medium of claim 8, wherein the operation of performing performance optimization operations in response to a stall condition comprises performing performance optimization operations in response to waiting for receipt of data needed by the processor core that caused the stall condition.

10. The machine-accessible medium of claim 8, wherein the checking of data concerning maximum values for clock frequency and power supply voltages to be provided to the processor comprises the processor being further caused to read data stored within a storage device within the processor that specifies a maximum value based on a limitation imposed by a characteristic of the processor.

11. A method according to claim 1, wherein the processor comprises a first processor and the operation of checking data concerning maximum values for clock frequency and power supply voltage are performed by a second processor in the processing unit.

* * * * *